(12) United States Patent
Baghel et al.

(10) Patent No.: US 11,134,362 B2
(45) Date of Patent: Sep. 28, 2021

(54) ZONE BASED SOFT RESOURCE PARTITIONING FOR HIGH RELIABILITY HIGH RANGE COMMUNICATION (HRHRC)

(71) Applicant: QUALCOMM Incorporated, San Diego, CA (US)

(72) Inventors: Sudhir Kumar Baghel, Hillsborough, NJ (US); Shailesh Patil, San Diego, CA (US); Tien Viet Nguyen, Bridgewater, NJ (US); Kapil Gulati, Dover, DE (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/366,877

(22) Filed: Mar. 27, 2019

(65) Prior Publication Data

US 2019/0357024 A1 Nov. 21, 2019

Related U.S. Application Data

(60) Provisional application No. 62/671,637, filed on May 15, 2018.

(51) Int. Cl.
*H04W 4/40* (2018.01)
*H04W 4/029* (2018.01)
*H04W 72/10* (2009.01)

(52) U.S. Cl.
CPC ............ *H04W 4/40* (2018.02); *H04W 4/029* (2018.02); *H04W 72/10* (2013.01)

(58) Field of Classification Search
CPC ...................................................... H04W 4/40
See application file for complete search history.

(56) References Cited

U.S. PATENT DOCUMENTS

| | | | |
|---|---|---|---|
| 8,155,056 B2* | 4/2012 | Miranda | H04W 28/02 370/328 |
| 2016/0295624 A1* | 10/2016 | Novlan | H04W 72/04 |
| 2017/0295579 A1 | 10/2017 | Sheng | |

(Continued)

FOREIGN PATENT DOCUMENTS

| | | |
|---|---|---|
| DE | 102016205143 A1 | 10/2017 |
| WO | 0150807 A1 | 7/2001 |

OTHER PUBLICATIONS

International Search Report and Written Opinion—PCT/US2019/024695—ISA/EPO—dated Jul. 1, 2019.

(Continued)

*Primary Examiner* — Edan Orgad
*Assistant Examiner* — Won Tae C Kim
(74) *Attorney, Agent, or Firm* — Patterson & Sheridan, LLP

(57) ABSTRACT

Techniques and apparatus for zone-based soft resource partitioning for high reliability high range communications (HRHRC) are described. A first wireless device determines, based at least in part on a location of the first wireless device and a type of traffic associated with the first wireless device, whether to use a first set of resources or a second set of resources for communications between the first wireless device and a second wireless device. The first wireless device communicates with the second wireless device on the first or second sets of resources, in accordance with the determination. The communications involve the type of traffic.

30 Claims, 12 Drawing Sheets

(56) References Cited

U.S. PATENT DOCUMENTS

2017/0311351 A1* 10/2017 Gupta .................. H04W 48/16
2019/0104512 A1*  4/2019 Vura ................... H04W 72/02
2019/0116586 A1*  4/2019 Basu Mallick ....... H04W 72/02
2019/0364449 A1* 11/2019 Yang ................... H04W 24/10
2020/0267558 A1*  8/2020 Vamanan ............. H04W 16/10

OTHER PUBLICATIONS

Ericsson: "Location-aware Resource Allocation for V2X," 3GPP Draft; R2-165515—Location-Aware Resource Allocation for V2X, 3rd Generation Partnership Project (3GPP), Mobile Competence Centre; 650, Route Des Lucioles; F-06921 Sophia-Antipolis Cedex; France, vol. RAN WG2, no. Gothenburg, Sweden; Aug. 22, 2016-Aug. 26, 2016, Aug. 21, 2016, XP051126979, 4 pages, Retrieved from the Internet: URL: http://www.3gpp.org/ftp/Meetings_3GPP_SYNC/RAN2/Docs/ [retrieved on Aug. 21, 2016], paragraph [02.1], [2.1.1].

* cited by examiner

ZONE BASED SOFT RESOURCE PARTITIONING FOR HIGH RELIABILITY HIGH RANGE COMMUNICATION (HRHRC)

CROSS-REFERENCE TO RELATED APPLICATION

This application claims the benefit of and priority to U.S. Provisional Patent Application No. 62/671,637, filed May 15, 2018, which is assigned to the assignee hereof and hereby expressly incorporated by reference herein.

BACKGROUND

I. Field of the Disclosure

Aspects of the present disclosure relate to wireless communications, and more particularly, to techniques and apparatus for zone-based resource partitioning for high reliability high range (HRHR) communications, e.g., in vehicle-to-everything (V2X) communications systems.

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Vehicle to everything communications seek to enable vehicles to communicate with one another to provide a host of services, including vehicle to vehicle communications (V2V), vehicle to infrastructure (V2I) communications, vehicle to grid (V2G) communications and vehicle to people (V2P) communications. Conventional wireless communication relies on network configuring essential physical layer parameter (number of antenna port, number of MIMO layer, MCS, etc.) at a relative slow time scale. Given the high mobility of cars, and the lack of network infrastructure in V2X applications, a more dynamic, autonomous framework should be designed to allow vehicular devices to configure itself with such essential parameters using its own perceived input and the information received from other devices.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects provide a method for wireless communication by a first wireless device, such as a user equipment (UE). The method generally includes determining, based at least in part on a location of the first wireless device and a type of traffic associated with the first wireless device, whether to use a first set of resources or a second set of resources for communications between the first wireless device and at least one second wireless device. The method also includes communicating with the at least one second wireless device on the first set of resources or the second set of resources, in accordance with the determination, wherein the communications involve the type of traffic.

Certain aspects provide an apparatus for wireless communication. The apparatus generally includes means for determining, based at least in part on a location of the apparatus and a type of traffic associated with the apparatus, whether to use a first set of resources or a second set of resources for communications between the apparatus and at least one wireless device. The apparatus also includes means for communicating with the at least one wireless device on the first set of resources or the second set of resources, in accordance with the determination, wherein the communications involve the type of traffic.

Certain aspects provide an apparatus for wireless communication. The apparatus generally includes at least one processor and a memory coupled to the at least one processor. The at least one processor is configured to determine, based at least in part on a location of the apparatus and a type of traffic associated with the apparatus, whether to use a first set of resources or a second set of resources for communications between the apparatus and at least one first wireless device. The at least one processor is also configured to communicate with the at least one first wireless device on the first set of resources or the second set of resources, in accordance with the determination, wherein the communications involve the type of traffic.

Certain aspects provide a computer-readable medium for wireless communications by a first wireless device, such as a UE. The computer-readable medium generally includes computer executable code, which when executed by at least one processor, causes the first wireless device to determine, based at least in part on a location of the apparatus and a type of traffic associated with the first wireless device, whether to use a first set of resources or a second set of resources for communications between the first wireless device and at least one second wireless device, and communicate with the at least one second wireless device on the first set of resources or the second set of resources, in accordance with the determination, wherein the communications involve the type of traffic.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
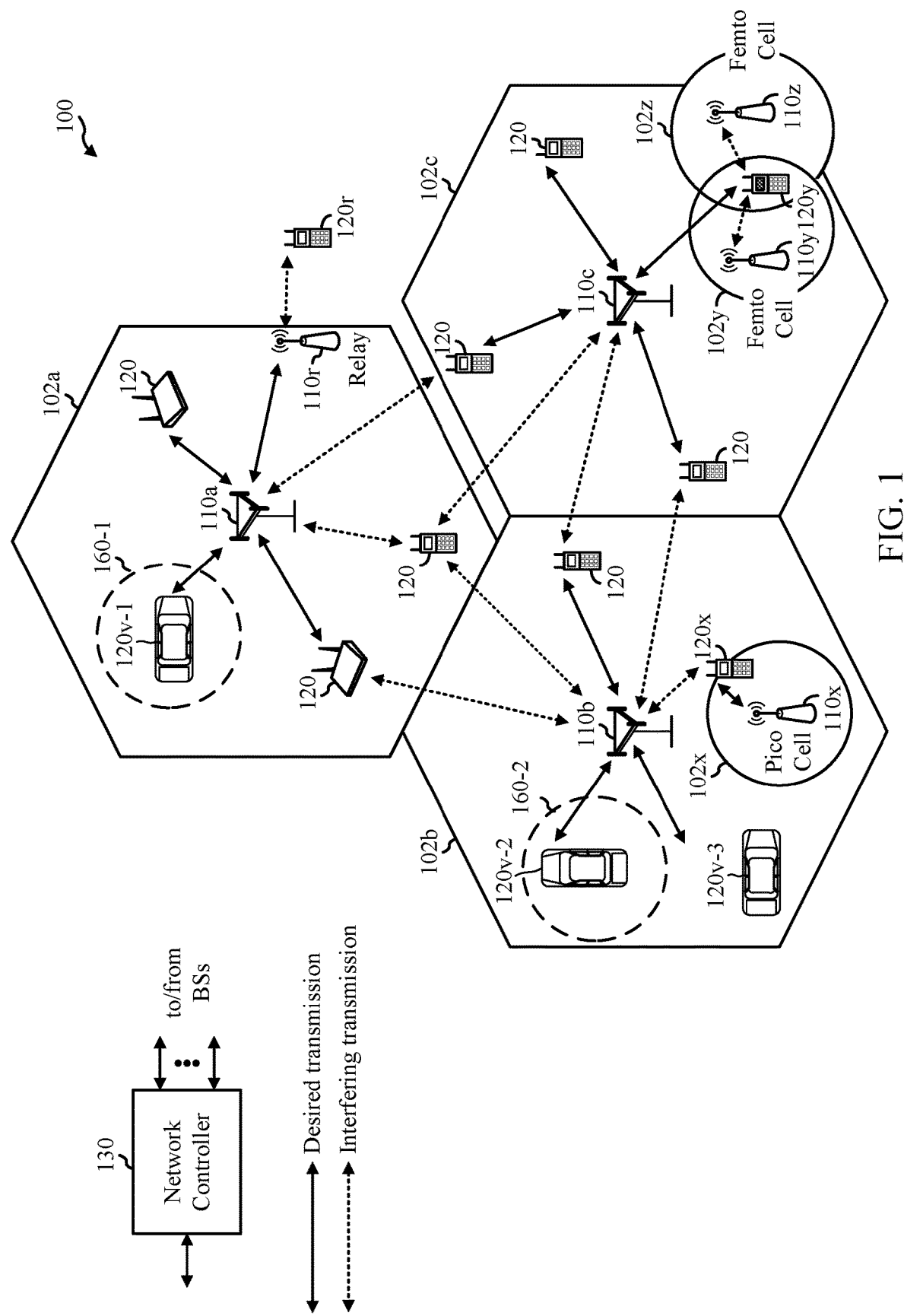
FIG. 1 is a block diagram conceptually illustrating an example telecommunications system, in accordance with certain aspects of the present disclosure.

Aspects of the present disclosure provide apparatus, methods, processing systems, and computer readable mediums for long term evolution (LTE) vehicle-to-everything communications systems and specifically new radio V2X (NR V2X) systems. Embodiments may also be applicable to LTE vehicle-to-everything (LTE-V2X) technologies to address vehicular wireless communications to enhance road safety and the driving experience.

NR V2X systems may support normal (e.g., lower priority) V2X traffic (e.g., for sensor sharing, intention sharing, etc.) in addition to higher priority V2X traffic (e.g., high reliability high range communication (HRHRC) V2X traffic). Compared to normal V2X traffic, higher priority V2X traffic may have a higher range and/or may be sent with higher reliability. Examples of higher priority V2X traffic includes, but is not limited to, data traffic associated with coordinated driving between vehicles, data traffic for intersection management (e.g., to allow intersection crossing(s) without waiting for traffic light(s)), etc. Examples of normal V2X traffic, includes, but is not limited to, data traffic for sensor information sharing between neighbor vehicles, data traffic for intention sharing between vehicles, etc. As the number of devices that support HRHRC continues to increase, it may be expensive to reserve resources for HRHRC in all areas all the time. Accordingly, it may be desirable to provide techniques for efficient resource utilization for HRHRC.

Aspects presented herein provide techniques for zone-based resource partitioning for HRHRC that can be used to provide efficient resource utilization for HRHRC. As described below, one or more geographical zones may be configured for wireless devices (e.g., V2X devices) and additional resources may be allocated for HRHRC within the geographical zone(s).

In some aspects, the resources within the geographical zone(s) may be partitioned/allocated between normal resources (e.g., for normal V2X traffic) and HRHRC resources (e.g., for HRHRC V2X traffic). In some aspects, the resources outside of the geographical zone(s) may be designated for normal V2X traffic.

A UE may determine whether to use the normal resources or the HRHRC resources based in part on a location of the UE (e.g., whether the UE is within the geographical zone(s) or outside of the geographical zone(s)) and the type of traffic (e.g., low priority traffic, high priority traffic, etc.) the UE wants to exchange. The UE may communicate (e.g., exchange the type of traffic) with at least another wireless device (e.g., another V2X device) using the normal or HRHRC resources in accordance with the determination.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, such as a 5G nextgen/NR network.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 27 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR introduces the concept of network slicing. For example, a network may have multiple slices, which may support different services, for example, internet of everything (IoE), URLLC, eMBB, vehicle-to-vehicle (V2V) communications, etc. A slice may be defined as a complete logical network that comprises of a set of network functions and corresponding resources necessary to provide certain network capabilities and network characteristics.

Example Wireless Communications System

FIG. 1 illustrates an example wireless communication network 100, such as a new radio (NR) or 5G network, in which aspects of the present disclosure may be performed, e.g., for zone-based partitioning of resources for HRHRC communications for NR V2X. For example, as illustrated, the wireless communication network 100 may include one or more geographical zones 160-1 and 160-2 in which additional resources are allocated for high priority V2X traffic (e.g., HRHRC V2X traffic), relative to the amount of resources allocated for high priority V2X traffic and/or low priority V2X traffic outside of the geographical zone(s) 160. The wireless communication network 100 may include one or more V2X devices that can use the additional resources within the geographical zone(s) 160 to communicate with other V2X devices in the wireless communication network 100. In the depicted example, vehicles 120v-1, 120v-2, and 120v-3 may be may be one type of UE supported by the wireless communication network 100 and may communicate with other vehicles, via V2X communications.

Using the techniques presented herein, a V2X device in the wireless communication network 100 may determine based, at least in part, on a location of the V2X device, whether to use the additional resources for the V2X traffic or to use another set of resources for the V2X traffic. As shown in this example, vehicle 120v-1 is located within geographical zone 160-1 and may determine to use the additional resources allocated for the V2X traffic within the geographical zone 160-1. Similarly, vehicle 120v-2 is located within geographical zone 160-2 and may determine to use the additional resources allocated for the V2X traffic within the geographical zone 160-2. Vehicle 120v-3, on the other hand, is located outside of the geographical zones 160-1 and 160-2 and may refrain from using the additional resources allocated for the V2X traffic within the geographical zones 160-1 and 160-2.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), NB, new radio base station (NR BS), 5G NB, access point (AP), 5G BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, 120*v*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, subbands, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

Aspects of the disclosure relate to apparatus, methods, processing systems, and computer readable mediums related to new radio V2X (NR V2X) systems as non-limiting examples. Other aspects may be applicable, for example, to LTE-V2X technologies, as a non-limiting example. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
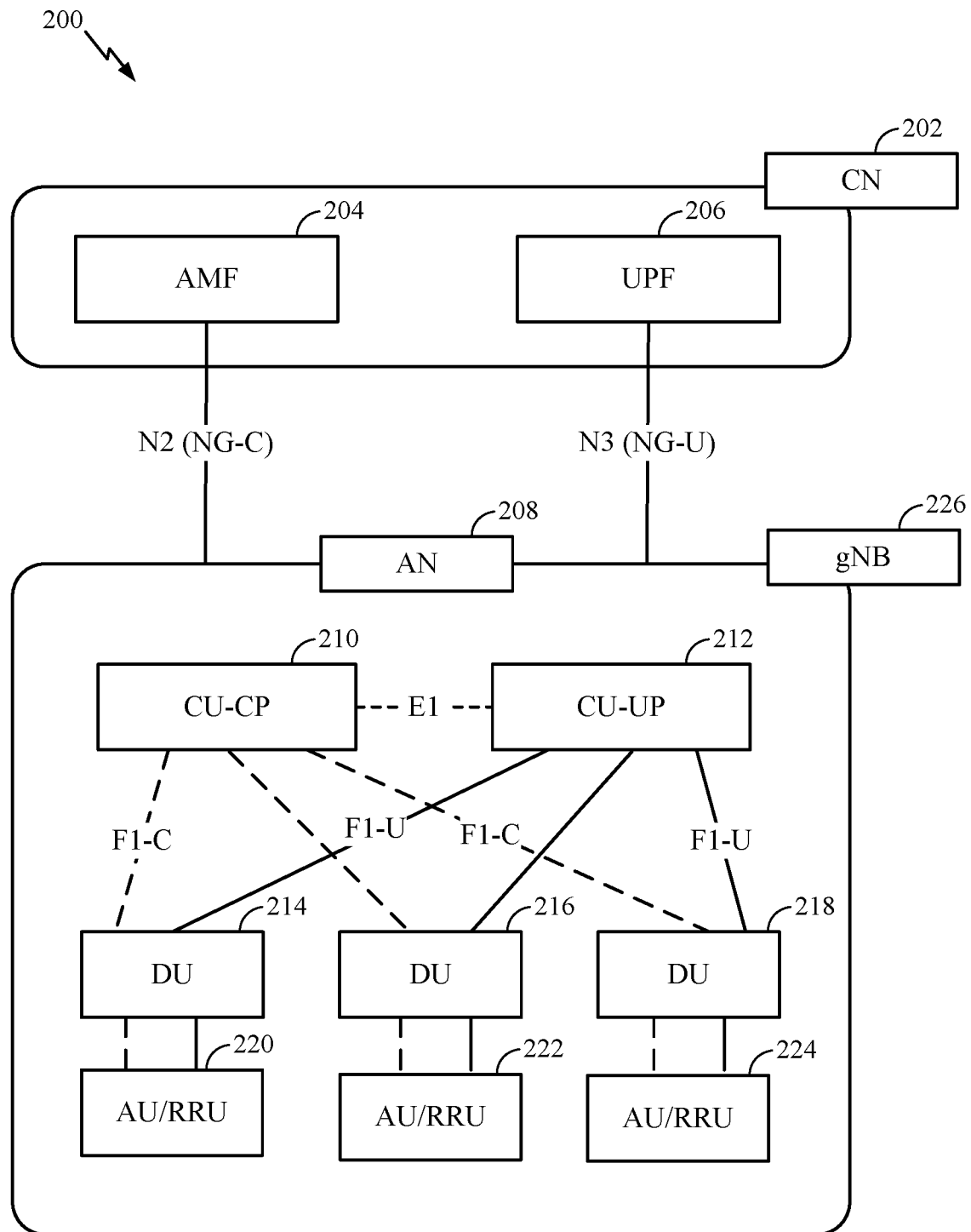
FIG. 2 is a block diagram illustrating an example architecture of a distributed radio access network (RAN), in accordance with certain aspects of the present disclosure.

FIG. 2 illustrates an example architecture of a distributed radio access network (RAN) 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 208 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE).

The CU-UP(s) 212 may be connected to the CU-CP 210. For example, the DU-UP(s) 212 and the CU-CP 210 may be connected via an E1 interface. The CU-CP(s) 212 may connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224. The DU may be connected to an AU/RRU via each of the F1-C and F1-U interfaces.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the N AN and/or UE.

Figure 3:
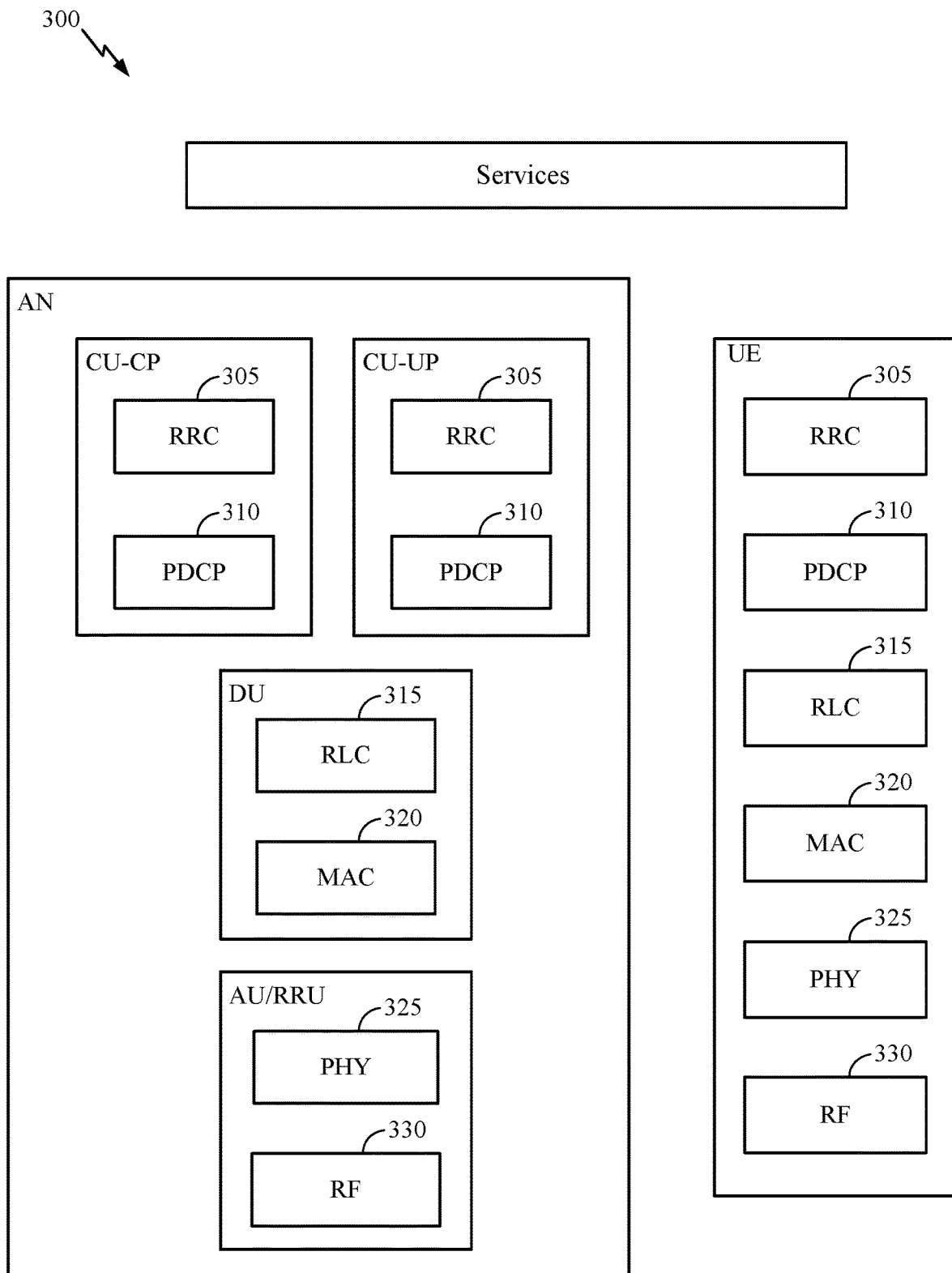
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
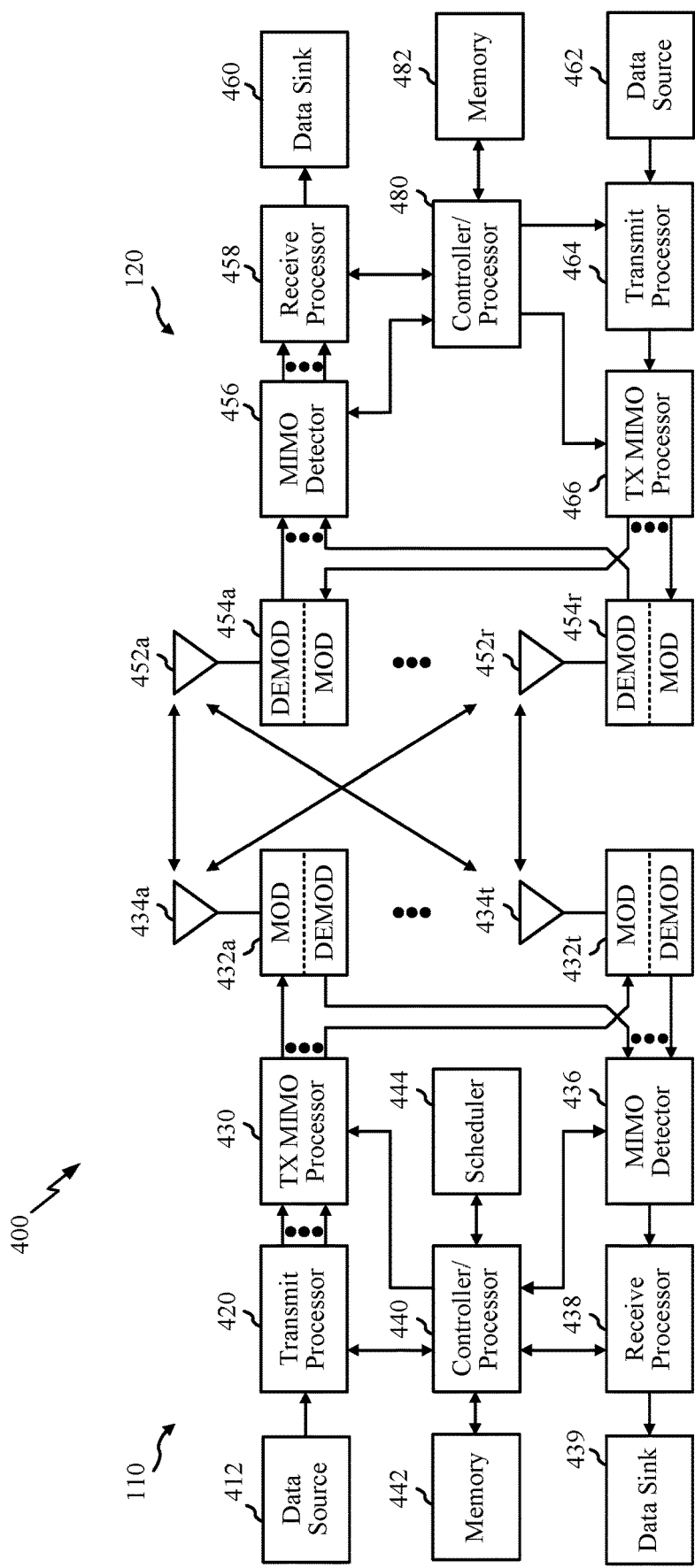
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. As noted above, the BS may include a TRP. One or more components of the UE 120 may be used to practice aspects of the present disclosure. For example, antennas 452, processors 466, 458, 464, and/or controller/processor 480 of the UE 120 may be used to perform the operations described herein and illustrated with reference to FIGS. 9-12, and/or other various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The processor 480 and/or other processors and modules at the UE 120 may perform or direct, e.g., the execution of the functional blocks illustrated in FIGS. 9 and 11-12, and/or other processes for the techniques described herein. The memories 442 and 482 may store data and program codes for BS 110 and UE 120, respectively. A scheduler 444 may schedule UEs for data transmission on the downlink and/or uplink.

Figure 5:
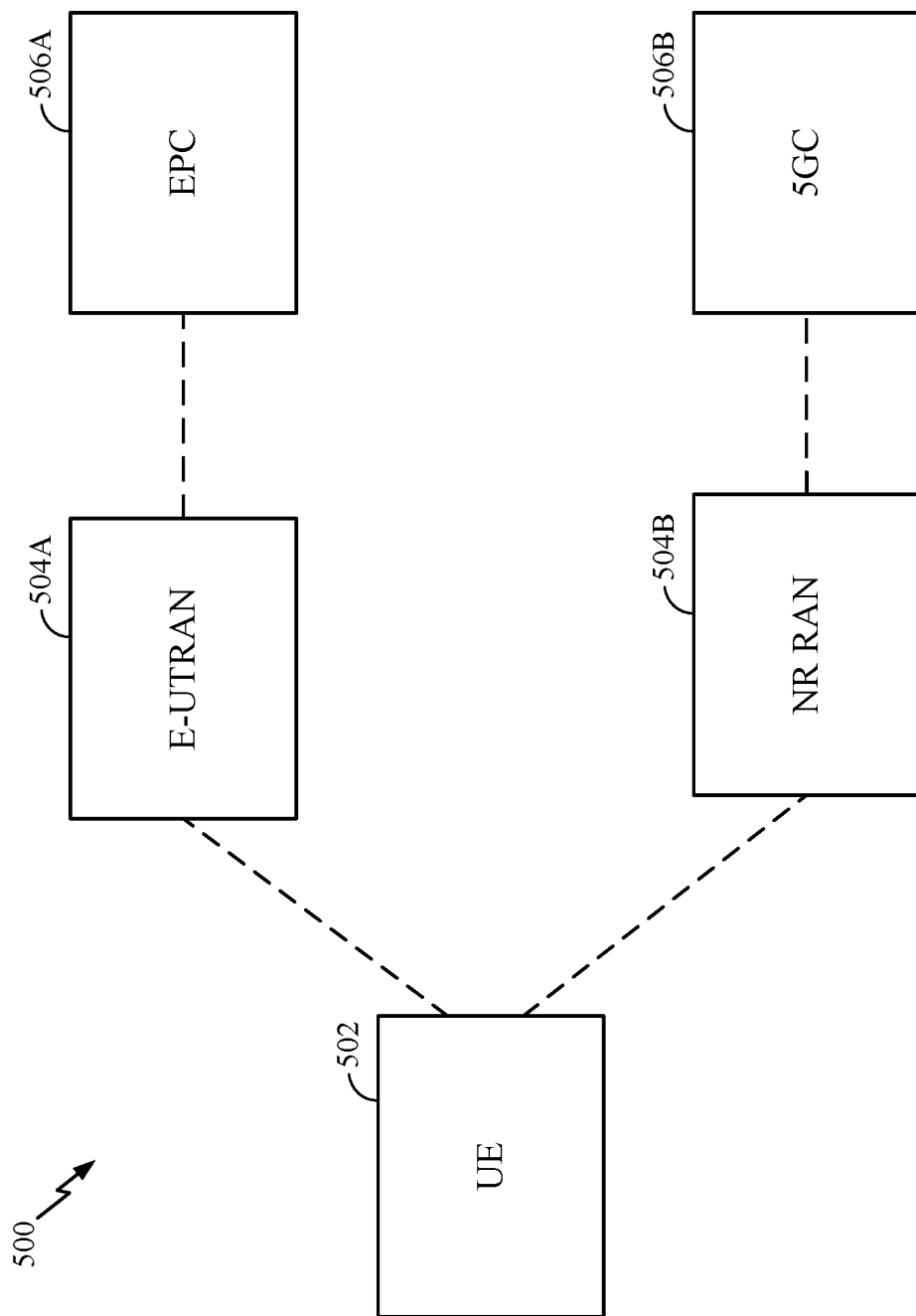
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in FIG. 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
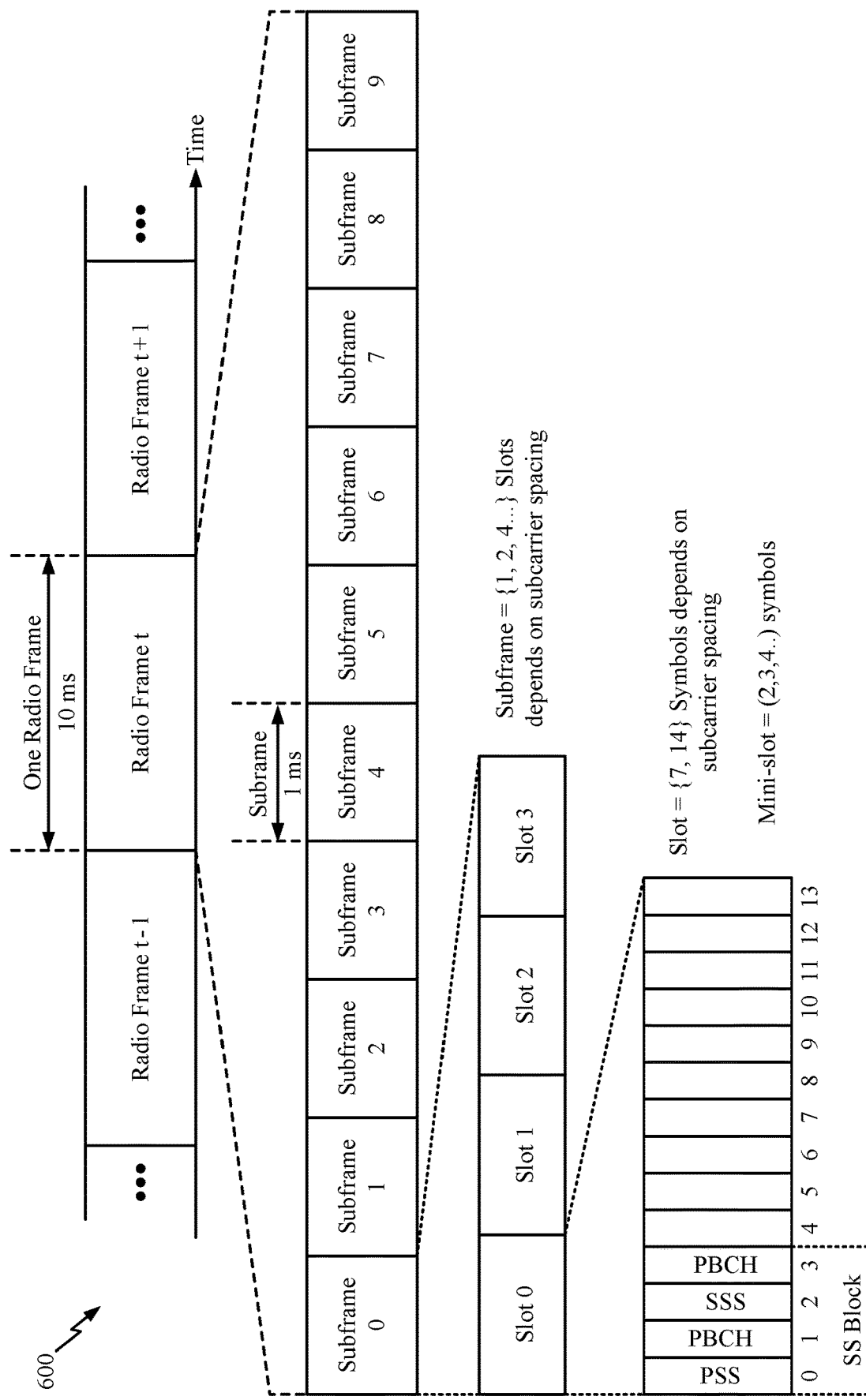
FIG. 6 illustrates an example of a frame format for a telecommunication system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

LTE vehicle-to-everything (LTE-V2X) has been developed as a technology to address basic vehicular wireless communications to enhance road safety and the driving experience. In other systems, new radio vehicle-to-everything (NR-V2X) has been developed as an additional technology that covers more advanced communication use case to further enhance road safety and driving experience. Non-limiting embodiments for frequencies covered may be, for example, 3 GHz to 5 GHz. As described below, V2X system methods and apparatus may be applicable to both LTE-V2X and NR-V2X as well as other frequencies. Other frequency spectrums other than those covered by LTE-V2X and NR-V2X are also considered to be applicable to the description and as such, the disclosure should not be considered limiting.

Figure 8:
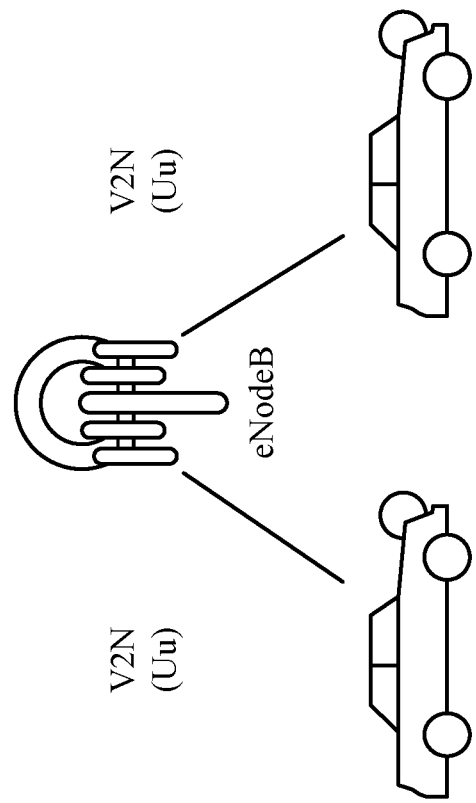
FIG. 8 illustrates a V2X system with network communication between vehicles, in accordance with aspects of the present disclosure.
Figure 7:
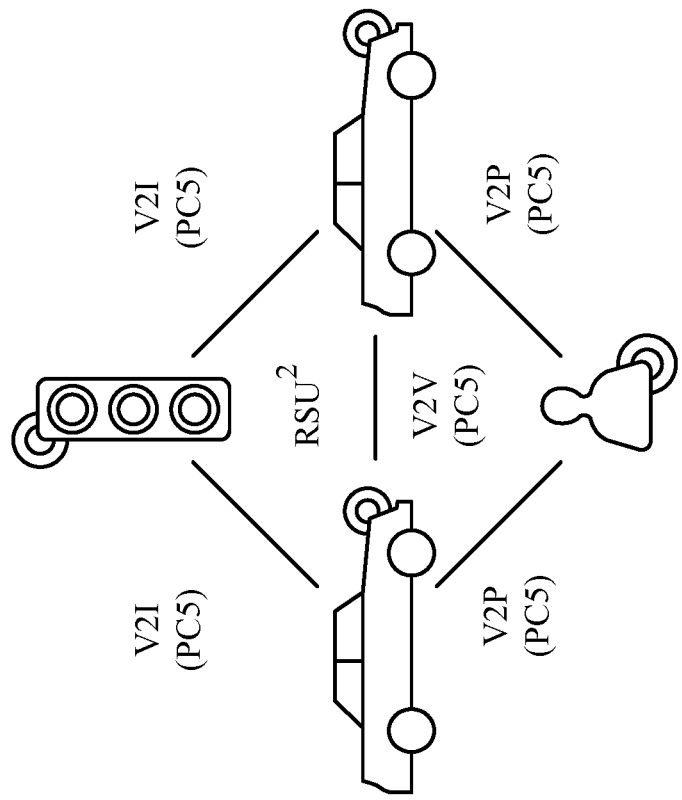
FIG. 7 illustrates a V2X system with direct communication between vehicles, in accordance with aspects of the present disclosure.

Referring to FIG. 7, a V2X system is illustrated with two vehicles. The V2X system, provided in FIGS. 7 and 8, provides two complementary transmission modes. A first transmission mode involves direct communications between participants in the local area. Such communications are illustrated in FIG. 7. A second transmission mode involves network communications through a network as illustrated in FIG. 8.

Referring to FIG. 7, the first transmission mode allows for direct communication between different participants in a given geographic location. As illustrated, a vehicle can have a communication with an individual (V2P) through a PC5 interface. Communications between a vehicle and another vehicle (V2V) may also occur through a PC5 interface. In a like manner, communication may occur from a vehicle to other highway components, such as a signal (V2I) through a PC5 interface. In each embodiment illustrated, two-way communication can take place between elements, therefore each element may be a transmitter and a receiver of information. In the configuration provided, the first transmission mode is a self-managed system and no network assistance is provided. Such transmission modes provide for reduced cost and increased reliability as network service interruptions do not occur during handover operations for moving vehicles. Resource assignments do not need coordination between operators and subscription to a network is not necessary, therefore there is reduced complexity for such self-managed systems.

In one, non-limiting embodiment, the V2X system is configured to work in a 5.9 GHz spectrum, thus any vehicle with an equipped system may access this common frequency and share information. Such harmonized/common spectrum operations allows for safe operation. V2X operations may also co-exist with 802.11p operations by being placed on different channels, thus existing 802.11p operations will not be disturbed by the introduction of V2X systems. In one non-limiting embodiment, the V2X system may be operated in a 10 MHz band that describes/contains basic safety services. In other non-limiting embodiments, the V2X system may support advanced safety services in addition to basic safety services described above. In another non-limiting embodiment, the V2X system may be used in a 5G NR V2X configuration, which is configured to interface with a wide variety of devices. By utilizing a 5G NR V2X configuration, multi Gbps rates for download and upload may be provided. In a V2X system that uses a 5G NR V2X configuration, latency is kept low, for example 1 ms, to enhance operation of the V2X system, even in challenging environments.

Referring to FIG. 8, a second of two complementary transmission modes is illustrated. In the illustrated embodiment, a vehicle may communicate with another vehicle through network communications. These network communications may occur through discrete nodes, such as eNodeB, that send and receive information between vehicles. The network communications may be used, for example, for long range communications between vehicles, such as noting the presence of an accident approximately 1 mile ahead. Other types of communication may be sent by the node to vehicles, such as traffic flow conditions, road hazard warnings, environmental/weather reports, service station availability and other like data. Data can be obtained from cloud-based sharing services.

For network communications, residential service units (RSUs) may be utilized as well as 4G/5G small cell communication technologies to benefit in more highly covered areas to allow real time information to be shared among V2X users. As the number of RSUs diminishes, the V2X systems may rely more on small cell communications, as necessary.

In either of the two complementary transmission modes, higher layers may be leveraged to tune congestion control parameters. In high density vehicle deployment areas, using higher layers for such functions provides an enhanced performance on lower layers due to congestion control for PHY/MAC.

The vehicle systems that use V2X technologies have significant advantages over 802.11p technologies. Conventional 802.11p technologies have limited scaling capabilities and access control can be problematic. In V2X technologies, two vehicles apart from one another may use the same resource without incident as there are no denied access requests. V2X technologies also have advantages over 802.11p technologies as these V2X technologies are designed to meet latency requirements, even for moving vehicles, thus allowing for scheduling and access to resources in a timely manner.

In the instance of a blind curve scenario, road conditions may play an integral part in decision making opportunities for vehicles. V2X communications can provide for significant safety of operators where stopping distance estimations may be performed on a vehicle by vehicle basis. These stopping distance estimations allow for traffic to flow around courses, such as a blind curve, with greater vehicle safety, while maximizing the travel speed and efficiency.

Example Zone Based Soft Resource Partitioning for HRHRC

As noted, NR-V2X systems may support the exchange of normal traffic (e.g., for sensor sharing, intention sharing, etc.), as well as high priority/importance (e.g., HRHRC) communications. The high priority communications may have to have a higher reliability and higher range compared to the normal traffic. However, since radio resources may be limited, some UEs may share the radio resources for normal and HRHRC traffic. At the same time, HRHRC traffic may be exchanged relatively infrequently (or not at all) in some areas, and may be triggered more frequently in other areas (e.g., road intersections). However, reserving resources for HRHRC traffic in all areas (e.g., or a large number of areas) at all times may be costly and inefficient.

Aspects presented herein provide a dynamic mechanism for resource sharing, e.g., for HRHRC traffic in V2X systems. More specifically, aspects presented provide techniques for partitioning resources used for HRHRC traffic and/or normal traffic based on one or more different geographical zones. The geographical zone(s) may be defined based on areas that are associated with high levels (e.g., above a threshold) of HRHRC traffic. In aspects, additional resources within the geographical zone(s) may be allocated for HRHRC traffic, and limited resources (or no resources) outside of the geographical zone(s) may be allocated for HRHRC traffic. By providing for a zone-based partitioning of resources for HRHRC traffic, techniques can allow for a more efficient use of resources in the V2X system.

Figure 9:
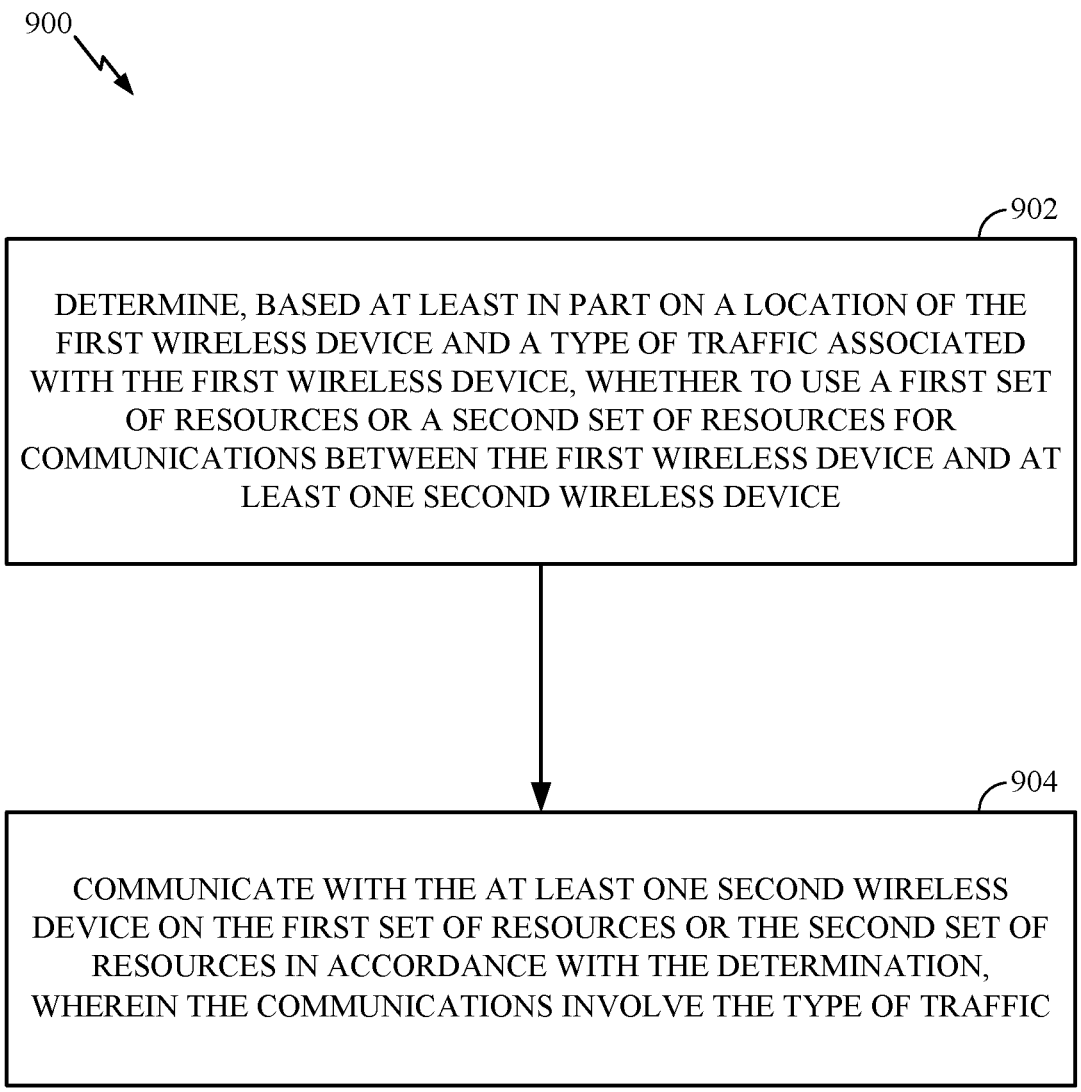
FIG. 9 is a flow diagram illustrating example operations for wireless communications, e.g., in a V2X system, in accordance with certain aspects of the present disclosure.

FIG. 9 illustrates example operations 900 for wireless communications, in accordance with aspects of the present disclosure. Operations 900 may be performed, for example, by a first wireless device, such as a UE (e.g., UE 120 shown in FIG. 1). Operations 900 may be implemented as software components that are executed and run on one or more processors (e.g., processor 480 of FIG. 4). Further, the communicating (e.g., transmission and/or reception of signals) by the first wireless device in operations 900 may be enabled, for example, by one or more antennas (e.g., antennas 452 of FIG. 4). In certain aspects, the communicating (e.g., transmission and/or reception of signals) by the first wireless device may be implemented via a bus interface of one or more processors (e.g., processor 480) obtaining and/or outputting signals.

Operations 900 begin, at 902, where the first wireless device determines, based at least in part on a location of the first wireless device and a type of traffic associated with the first wireless device, whether to use a first set of resources or a second set of resources for communications between the first wireless device and at least one second wireless device. The first wireless device and the at least one second wireless device may be V2X devices.

At 904, the first wireless device communicates with at least one second wireless device (e.g., another UE 120) on the first set of resources or the second set of resources, in accordance with the determination, wherein the communications involve the type of traffic. The first set of resources may be associated with (e.g., dedicated for) a first type of V2X traffic (e.g., HRHRC V2X traffic). The second set of resources may be associated with (e.g., dedicated for) a different second type of V2X traffic (e.g., normal V2X traffic). The first type of traffic may have a higher priority than the second type of traffic. As used herein, a set of resources may refer to a set of time and/or frequency resources.

In some aspects, one or more geographical zones may be configured for V2X systems. Additional resources (e.g., HRHRC resources) may be configured for exchanging the first type of traffic in the geographical zone(s). For example, if the first wireless device determines its location is within the geographical zone(s), the first wireless device can use the first set of resources to exchange the first type of traffic. In some aspects, there may be priority access for UEs that want to exchange the first type of traffic (e.g., HRHRC V2X traffic) within the geographical zone(s).

In some aspects, there may be secondary access for UEs that want to exchange the second type of traffic (e.g., normal traffic) within the geographical zones. For example, a UE that wants to transmit normal traffic may perform a sensing mechanism in the first set of resources (e.g., HRHRC resources). If the UE does not detect that another UE (e.g., HRHRC UE) is using the first set of resources, the UE may use the first set of resources to exchange the second type of traffic (e.g., normal V2X traffic). In such cases, the UE may transmit normal V2X traffic in the first set of resources by performing an access procedure, such as a listen-before-talk (LBT) procedure. In some aspects, if another (high priority) UE that has priority access wants to exchange the first type of traffic while the (lower priority) UE is using the first set of resources to exchange the second type of traffic, the (high priority) UE may refrain from using the first set of resources while the (lower priority) UE is using the first set of resources to exchange the second type of traffic. Once the (high priority) UE determines that the (lower priority) UE is no longer using the first set of resources, the (high priority) UE can begin exchanging the first type of traffic on the first set of resources.

In some examples, if the first wireless device determines that its location is outside the geographical zone(s), the first wireless device can use the second set of resources to exchange the second type of traffic. In some aspects, the first wireless device may not use the first set of resources if it determines that its location is outside the geographical zone(s).

In some aspects, the first set of resources (e.g., HRHRC resources) within the geographical zone(s) may be further partitioned into different sets of resources for UEs that are oriented (or travelling) in different directions. For example, the first set of resources may include a (third) set of resources associated with a first direction (e.g., vertical direction) and/or a (fourth) set of resources associated with a second direction (e.g., horizontal direction). A UE may determine which of the third set of resources and the fourth set of resources to use for the first type of traffic (e.g., HRHRC V2X traffic) based on its orientation within the geographical zone(s). For example, if the UE is oriented or traveling in the first direction, the UE may use the third set of resources, and if the UE is oriented or traveling in the second direction, the UE may use the fourth set of resources.

In some aspects, information regarding the resource partitioning, e.g., including the allocated sets of resources, geographical zone(s), etc., may be signaled to the UEs from a base station. In some aspects, the resource partitioning information may be pre-configured for each UE in the network. In some aspects, the UEs may negotiate among each other to determine and agree on the resource partitioning information. For example, each UE may exchange messages with other UE(s) to determine the allocated sets of resources, geographical zone(s), etc. Once agreed, one of the UEs (or a base station) may broadcast the information within the system.

Figure 10:
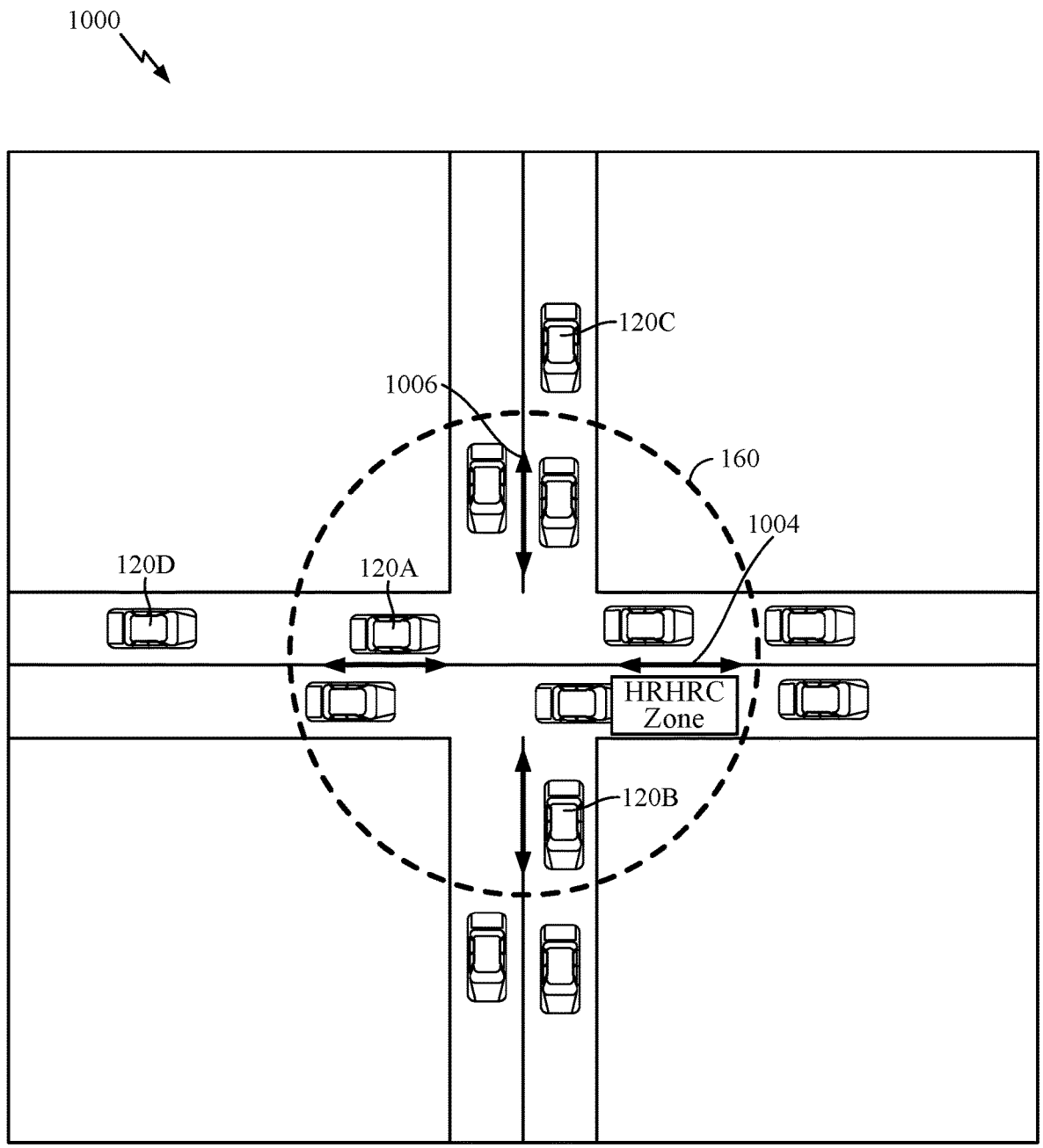
FIG. 10 illustrates an example of zone-based resource partitioning in a V2X system, in accordance with certain aspects of the present disclosure.

FIG. 10 illustrates one reference example of zone-based resource partitioning, according to certain aspects of the present disclosure. As shown, a geographical zone 160 may be configured, where additional HRHRC resources are configured for HRHRC V2X traffic within the geographical zone 160, e.g., to provide more reliability for HRHRC V2X traffic. On the other hand, there may limited resources (or no resources) allocated for HRHRC V2X traffic outside of the geographical zone 160. The geographical zone 160 may be defined in an area associated with frequent exchange of HRHRC V2X traffic, e.g., compared to other geographical areas. In this example, geographical zone 160 is defined over an intersection.

UEs (e.g., UEs 120A, 120B) within geographical zone 160 may use HRHRC resources to communicate (e.g., send/receive) HRHRC V2X traffic. UEs (e.g., UEs 120C, 120D) outside geographical zone 160 may use normal resources to communicate normal V2X traffic and may not use HRHRC resources to communicate HRHRC V2X traffic. In some aspects, HRHRC resources within geographical zone 160 may co-exist with normal resources within geographical zone 160. UEs within geographical zone 160 that want to transmit HRHRC V2X traffic may have priority access to the HRHRC resources. On the other hand, UEs within geographical zone 160 that want to transmit normal V2X traffic may have secondary access to the HRHRC resources. For example, these UEs may first perform a sensing mechanism to determine if another UE is using the HRHRC resources, and if no UE is detected, may perform a LBT-based mechanism to access the HRHRC resources for communicating normal V2X traffic. In some aspects, (high priority) UEs that want to transmit HRHRC V2X traffic may also perform a sensing mechanism to determine if another UE is using the HRHRC resources, e.g., before transmitting HRHRC V2X traffic on the HRHRC resources. For example, if such UEs detect (e.g., based on the sensing mechanism) that the HRHRC resources are being used by a (lower priority) UE to transmit normal V2X traffic, the (high priority) UEs may refrain from communicating on the HRHRC resources until the (lower priority) UE has finished occupying (using) the HRHRC resources.

In some aspects, the HRHRC resources within geographical zone 160 may be partitioned into a set of HRHRC resources for a horizontal direction 1004 and a set of HRHRC resources for a vertical direction 1006. If a UE (e.g., UE 120A) determines that it is oriented or traveling in the horizontal direction 1004, the UE may use the set of HRHRC resources for the horizontal direction 1004. If a UE (e.g., UE 120B) determines that it is oriented or traveling in the vertical direction 1006, the UE may use the set of HRHRC resources for the vertical direction 1006. The UE may determines its location, orientation, etc., based on sensors (e.g., GPS), communications from other UEs, measurements, etc. Note that FIG. 10 uses a horizontal direction and vertical direction as reference examples of different orientations that can be associated with different sets of HRHRC resources. Those of ordinary skill in the art will recognize that the HRHRC resources within the geographical zone 160 can be partitioned into different sets of HRHRC resources for other orientations (e.g., besides vertical and horizontal).

In some aspects, with a zone-based partitioning of resources, the near/far effect (e.g., in-band interference effect (IBE), inter-symbol interference (ISI), and/or intercarrier interference (ICI)) can be reduced, e.g., by reducing the maximum distance/pathloss between two concurrent transmitters. In some cases, this can be achieved by allowing UEs in the same zone to transmit at the same time (e.g., partitioning the resources in time domain between different zones).

Figure 11:
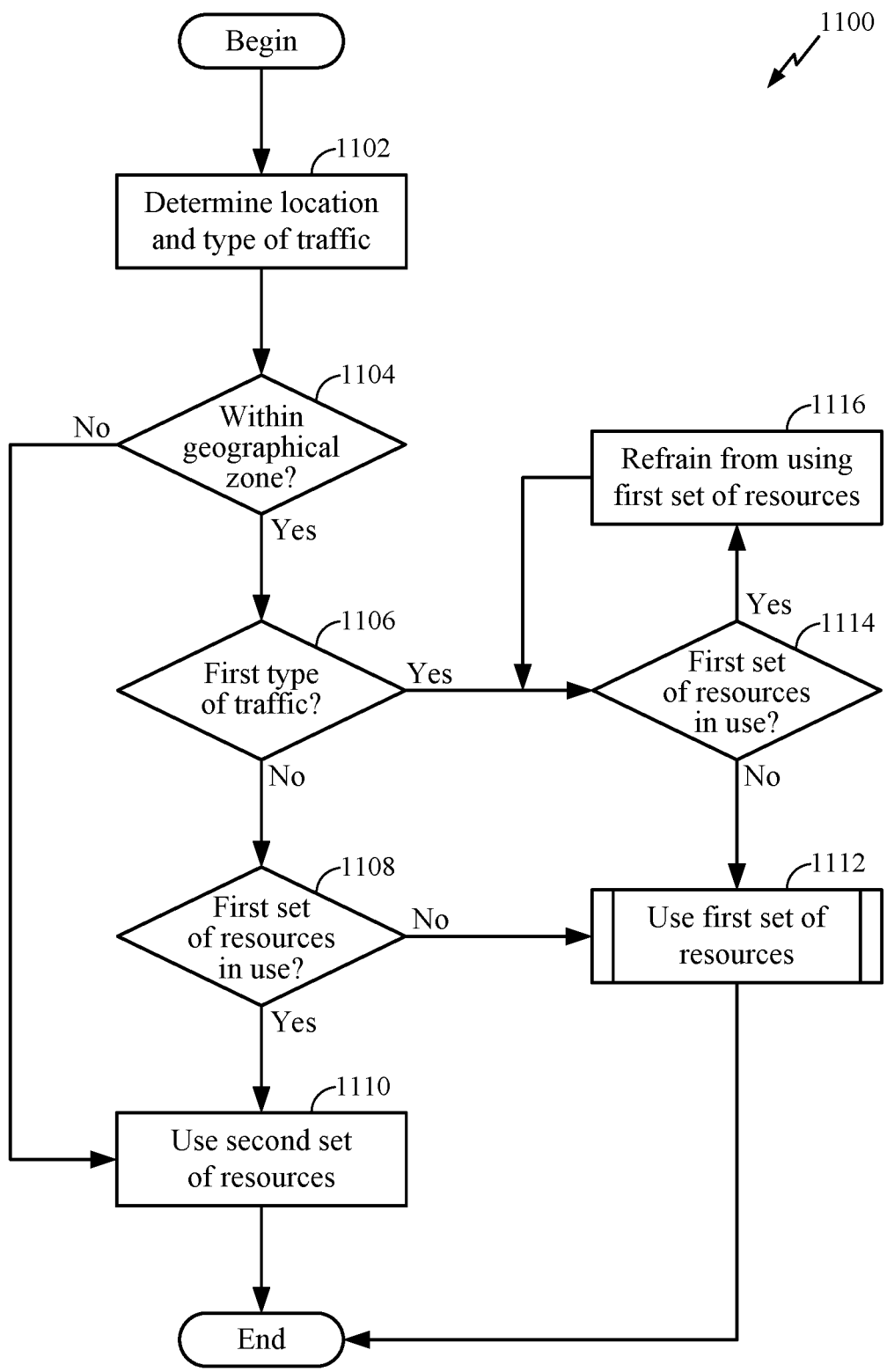
FIG. 11 is a flowchart illustrating example operations for wireless communications, e.g., in a V2X system, in accordance with certain aspects of the present disclosure.

FIG. 11 illustrates example operations 1100 for wireless communications, in accordance with aspects of the present disclosure. Operations 1100 may be performed, for example, by a first wireless device, such as a UE (e.g., UE 120 shown in FIG. 1). Operations 1100 may be implemented as software components that are executed and run on one or more processors (e.g., processor 480 of FIG. 4). Further, the communicating (e.g., transmission and/or reception of signals) by the first wireless device in operations 1100 may be enabled, for example, by one or more antennas (e.g., antennas 452 of FIG. 4). In certain aspects, the communicating (e.g., transmission and/or reception of signals) by the first wireless device may be implemented via a bus interface of one or more processors (e.g., processor 480) obtaining and/or outputting signals.

Operations 1100 begin, at 1102, where the first wireless device determines a location of the first wireless device (e.g., whether the first wireless device is within a geographical zone designated for exchanging the first type of traffic, such as geographical zone 160) and a type of traffic (e.g., first type of traffic, such as HRHRC V2X traffic, or a second type of traffic, such as normal V2X traffic) that the first wireless device wants to exchange (e.g., with at least another wireless device).

At 1104, the first wireless device determines if its location is within a geographical zone designated for exchanging at least the first type of traffic (e.g., geographical zone 160). If not, the first wireless device determines to use the second set of resources (e.g., normal resources) for communications (e.g., with at least another wireless device) and exchanges traffic on the second set of resources. For example, as noted, there may limited resources (no resources) allocated for high priority communications, such as HRHRC V2X traffic, outside of the geographical zone.

If, at 1104, the first wireless device determines it is within the geographical zone designated for exchanging at least the first type of traffic, the first wireless device determines if the type of traffic is the first type of traffic (1106). If so, the first wireless device determines if the first set of resources (e.g., HRHRC resources) are currently in use (e.g., by another wireless device) (1114). For example, as noted, there may be situations in which a (lower priority) wireless device is using the first set of resources to exchange the second type of traffic (e.g., normal V2X traffic). The first wireless device can determine whether this is case by performing a sensing mechanism prior to using the first set of resources to exchange the first type of traffic. If the first wireless device determines (or detects) that the (lower priority) wireless device is using the first set of resources, the first wireless device refrains from using the first set of resources (e.g., until the (lower priority) wireless device has finished) (1116). On the other hand, if the first wireless device determines that the first set of resources is not in use (1114), the first wireless device uses the first set of resources (1112). For example, the first wireless device can begin exchanging the first type of traffic with at least another wireless device on the first set of resources.

If, at 1106, the first wireless device determines that the type of traffic is the second type of traffic, the first wireless device determines if the first set of resources is in use (e.g., by another (higher priority) wireless device) (1108). As noted, in some cases, a (low priority) wireless device that wants to communicate the second type of traffic may have secondary access to the first set of resources. In this case, the (low priority) wireless device may perform a sensing mechanism to determine if the first set of resources is in use by another wireless device. If the first set of resources is not in use, the first wireless device determines to use the first set of resources (1112). On the other hand, if the first set of resources is in use, the first wireless device determines to use the second set of resources (1110).

Figure 12:
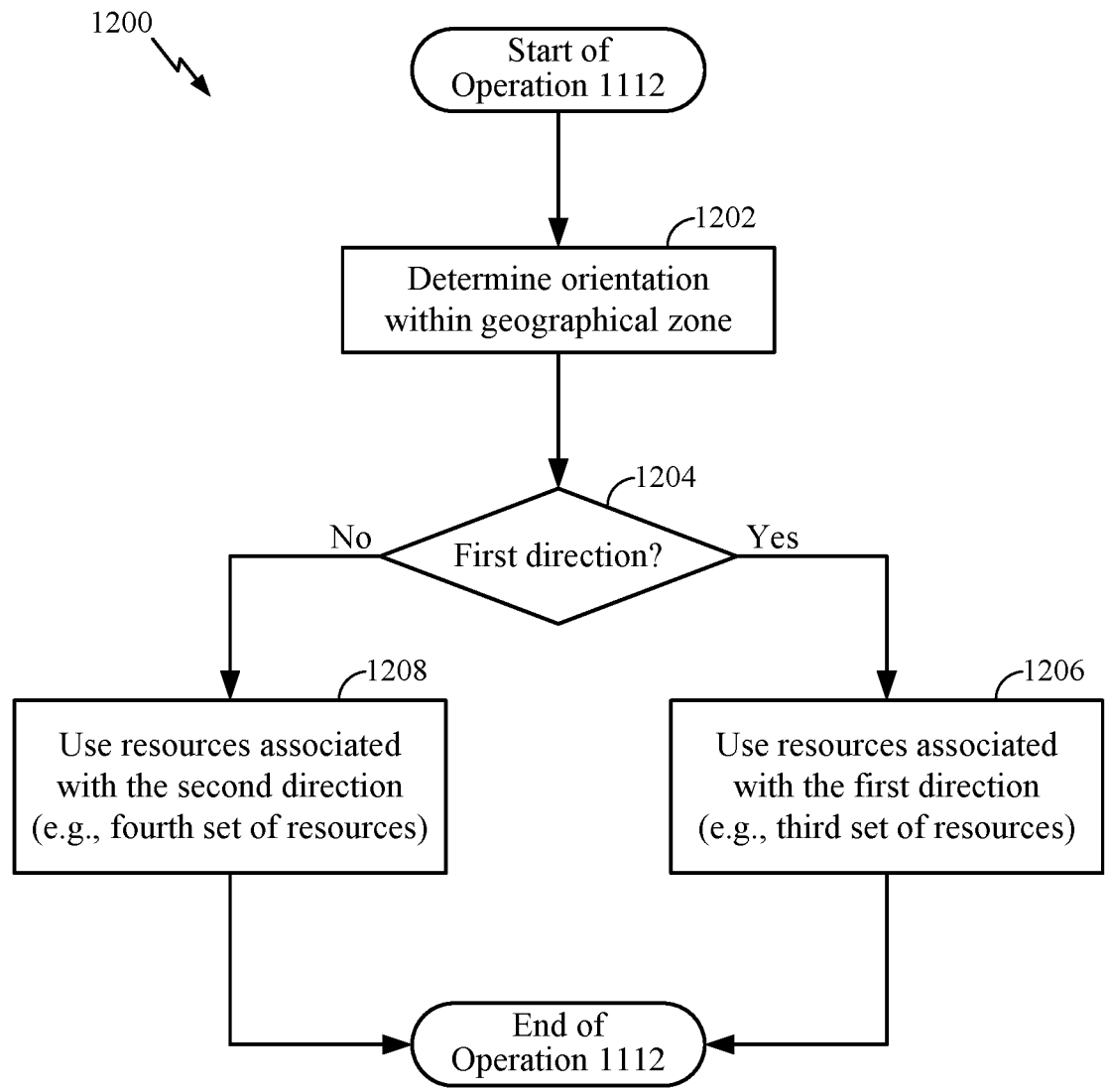
FIG. 12 is another flowchart illustrating example operations for wireless communications, e.g., in a V2X system, in accordance with certain aspects of the present disclosure.

FIG. 12 illustrates example operations 1200 for wireless communications, in accordance with aspects of the present disclosure. Operations 1200 may be performed, for example, by a first wireless device, such as a UE (e.g., UE 120 shown in FIG. 1). Operations 1200 may be implemented as software components that are executed and run on one or more processors (e.g., processor 480 of FIG. 4). Further, the communicating (e.g., transmission and/or reception of signals) by the first wireless device in operations 1200 may be enabled, for example, by one or more antennas (e.g., antennas 452 of FIG. 4). In certain aspects, the communicating (e.g., transmission and/or reception of signals) by the first wireless device may be implemented via a bus interface of one or more processors (e.g., processor 480) obtaining and/or outputting signals. The operations 1200 may be performed as part of operations 1112 in FIG. 11.

Operations 1200 begin at 1202, where the first wireless device determines an orientation of the first wireless device within the geographical zone designated for exchanging at least the first type of traffic (e.g., geographical zone 160). As noted, in some cases, the first set of resources within the geographical zone may be further partitioned into different sets of resources allocated for different orientations (or directions). Here, if the first wireless device determines that its orientation is in the first direction (e.g., vertical direction, such as vertical direction 1006) (1204), the first wireless device uses the resources associated with the first direction (e.g., the third set of HRHRC resources) (1206). On the other hand, if the first wireless device determines that its orientation is in the second direction (e.g., horizontal direction, such as horizontal direction 1004), the first wireless device uses the resources associated with the second direction (e.g., the fourth set of HRHRC resources) (1208).

Figure 13:
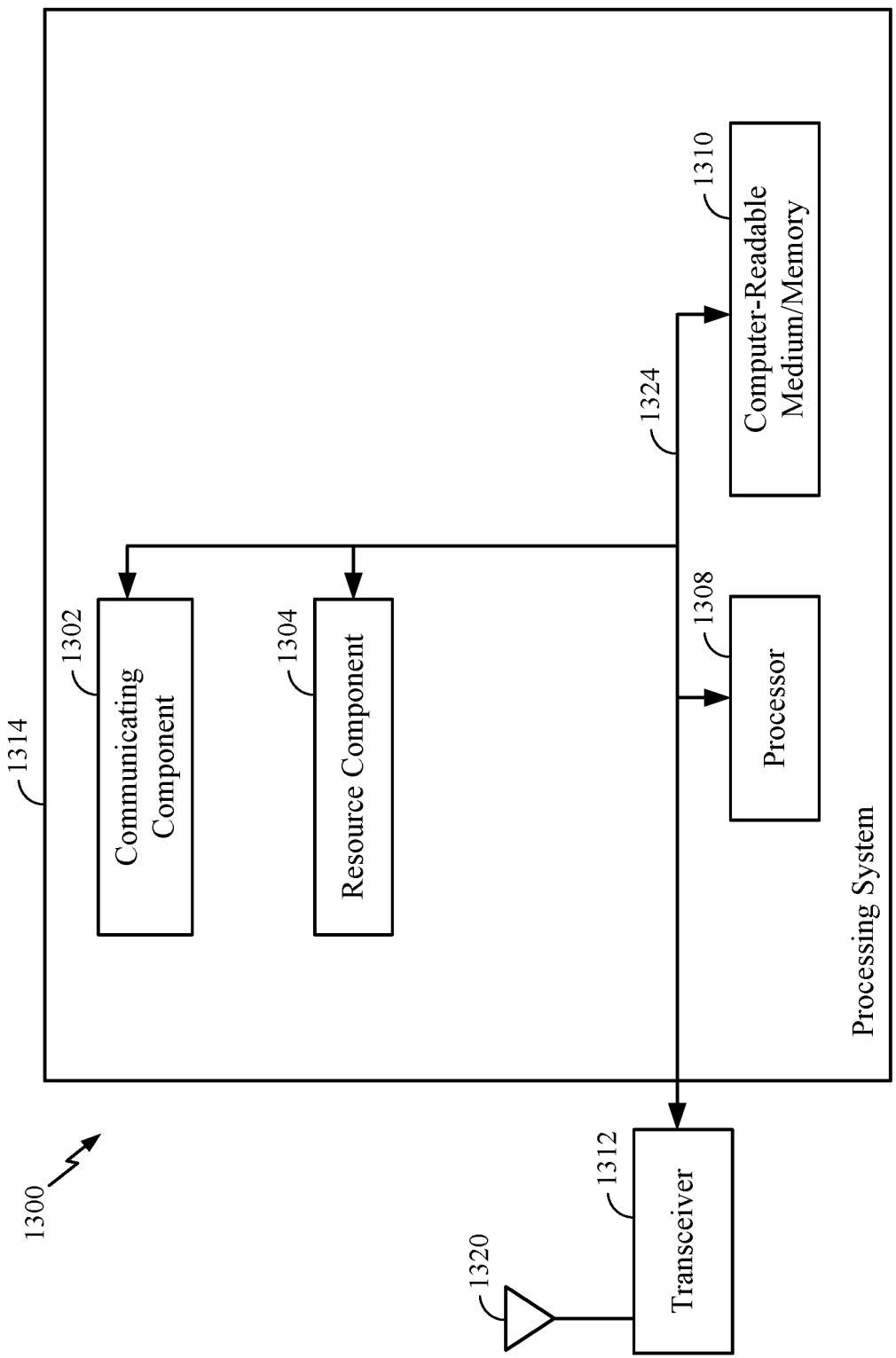
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIGS. 9 and 11-12. The communications device 1300 includes a processing system 1314 coupled to a transceiver 1312. The transceiver 1312 is configured to transmit and receive signals for the communications device 1300 via an antenna 1320, such as the various signals described herein. The processing system 1314 may be configured to perform processing functions for the communications device 1300, including processing signals received and/or to be transmitted by the communications device 1300.

The processing system 1314 includes a processor 1308 coupled to a computer-readable medium/memory 1310 via a bus 1324. In certain aspects, the computer-readable medium/memory 1310 is configured to store instructions that when executed by processor 1308, cause the processor 1308 to perform the operations illustrated in FIGS. 9 and 11-12, or other operations for performing the various techniques discussed herein.

In certain aspects, the processing system 1314 further includes a communicating component 1302 for performing the operations illustrated at 904 in FIG. 9, operations illustrated at 1110, 1112, and 1116 in FIG. 11, and operations illustrated at 1206 and 1208 in FIG. 12. Additionally, the processing system 1314 includes a resource component 1304 for performing the operations illustrated at 902 in FIG. 9, operations 1102, 1104, 1106, 1108, 1110, 1112, 1114, and 1116 illustrated in FIG. 11, and operations 1202, 1204, 1206, and 1208 illustrated in FIG. 12. The communicating component 1302 and resource component 1304 may be coupled to the processor 1308 via bus 1324. In certain aspects, the communicating component 1302 and resource component 1304 may be hardware circuits. In certain aspects, the communicating component 1302 and resource component 1304 may be software components that are executed and run on processor 1308.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for sending, means for signaling, means for indicating, means for assigning, means for providing, means for retrieving, means for interacting, means for negotiating, means for exchanging, means for communicating, and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for identifying, means for determining, means for negotiating, means for agreeing, means for signaling, means for storing, means for interacting, means for configuring, means for generating, means for assigning, means for providing, means for updating, means for modifying, means for changing, means for selecting, means for performing, means for using, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first wireless device, comprising:
   determining whether to use a first set of resources associated with at least a first type of traffic within a geographical zone for communications between the first wireless device and at least one second wireless device, based at least in part on a location of the first wireless device with respect to the geographical zone, a type of traffic associated with the first wireless device, and whether a third wireless device within the geographical zone is using the first set of resources, wherein:
      the first set of resources is different than a second set of resources associated with a different second type of traffic having a lower priority than the first type of traffic;
      the determination is to use the first set of resources when (i) the type of traffic is the first type of traffic and (ii) the location of the first wireless device is within the geographical zone;
      the determination is to use the first set of resources when (i) the type of traffic is the second type of traffic, (ii) the location of the first wireless device is within the geographical zone, and (iii) the first wireless device does not detect that the third wireless device within the geographical zone is using the first set of resources; and
      the determination is to use the second set of resources when (i) the type of traffic is the second type of traffic or (ii) the location of the first wireless device is not within the geographical zone; and
   communicating with the at least one second wireless device on the first set of resources or the second set of resources, in accordance with the determination, wherein the communications involve the type of traffic.

2. The method of claim 1, wherein:
the first wireless device and the at least one second wireless device are vehicle-to-everything (V2X) devices;
the first type of traffic is a first type of V2X traffic; and
the second type of traffic is a second type of V2X traffic.

3. The method of claim 1, wherein communicating with the at least one second wireless device comprises refraining from using the first set of resources while the first set of resources are being used by at least one third wireless device.

4. The method of claim 1, wherein the determination is to use the second set of resources when the type of traffic is the second type of traffic and the location of the first wireless device is within the geographical zone.

5. The method of claim 1, wherein the first set of resources further comprises a third set of resources associated with a first direction and a fourth set of resources associated with a second direction different from the first direction, the method further comprising determining whether to use the third set of resources or the fourth set of resources further based on a direction of the first wireless device.

6. The method of claim 5, wherein:
the determination is to use the third set of resources when the type of traffic is the first type of traffic, the first wireless device is oriented in the first direction, and the location of the first wireless device is within the geographical zone; or
the determination is to use the fourth set of resources when the type of traffic is the first type of traffic, the first wireless device is oriented in the second direction, and the location of the first wireless device is within the geographical zone.

7. The method of claim 1, wherein at least one of the first set of resources, the second set of resources, or the geographical zone is determined based on signaling from a base station.

8. The method of claim 1, wherein at least one of the first set of resources, the second set of resources, or the geographical zone is pre-configured for the first wireless device.

9. The method of claim 1, wherein at least one of the first set of resources, the second set of resources, or the geographical zone is determined based on a negotiation with the at least one second wireless device.

10. An apparatus for wireless communication, comprising:
at least one processor configured to:
determine whether to use a first set of resources associated with at least a first type of traffic within a geographical zone for communications between the apparatus and at least one first wireless device, based at least in part on a location of the apparatus with respect to the geographical zone, a type of traffic associated with the apparatus, and whether a second wireless device within the geographical zone is using the first set of resources, wherein:
the first set of resources is different than a second set of resources associated with a different second type of traffic having a lower priority than the first type of traffic;
the determination is to use the first set of resources when (i) the type of traffic is the first type of traffic and (ii) the location of the apparatus is within the geographical zone;
the determination is to use the first set of resources when (i) the type of traffic is the second type of traffic, (ii) the location of the apparatus is within the geographical zone, and (iii) the apparatus does not detect that the second wireless device within the geographical zone is using the first set of resources; and
the determination is to use the second set of resources when (i) the type of traffic is the second type of traffic or (ii) the location of the apparatus is not within the geographical zone; and
communicate with the at least one first wireless device on the first set of resources or the second set of resources, in accordance with the determination, wherein the communications involve the type of traffic; and
a memory coupled to the at least one processor.

11. The apparatus of claim 10, wherein:
the apparatus and the at least one first wireless device are vehicle-to-everything (V2X) devices;
the first type of traffic is a first type of V2X traffic; and
the second type of traffic is a second type of V2X traffic.

12. The apparatus of claim 10, wherein the at least one processor communicates with the at least one first wireless device by refraining from using the first set of resources while the first set of resources are being used by a third wireless device.

13. The apparatus of claim 10, wherein the at least one processor determines to use the second set of resources when the type of traffic is the second type of traffic and the location of the apparatus is within the geographical zone.

14. The apparatus of claim 10, wherein:
the first set of resources further comprises a third set of resources associated with a first direction and a fourth set of resources associated with a second direction different from the first direction; and
the at least one processor further determines whether to use the third set of resources or the fourth set of resources for the communications further based on a direction of the apparatus.

15. The apparatus of claim 14, wherein:
the at least one processor determines to use the third set of resources when the type of traffic is the first type of traffic, the apparatus is oriented in the first direction, and the location of the apparatus is within the geographical zone; or
the at least one processor determines to use the fourth set of resources when the type of traffic is the first type of traffic, the apparatus is oriented in the second direction, and the location of the apparatus is within the geographical zone.

16. The apparatus of claim 10, wherein at least one of the first set of resources, the second set of resources, or the geographical zone is determined based on signaling from a base station.

17. The apparatus of claim 10, wherein at least one of the first set of resources, the second set of resources, or the geographical zone is pre-configured for the apparatus.

18. The apparatus of claim 10, wherein at least one of the first set of resources, the second set of resources, or the geographical zone is determined based on a negotiation with the at least one first wireless device.

19. An apparatus for wireless communication, comprising:
means for determining whether to use a first set of resources associated with at least a first type of traffic within a geographical zone for communications between the apparatus and at least one first wireless device, based at least in part on a location of the apparatus with respect to the geographical zone, a type of traffic associated with the apparatus, and whether a second wireless device within the geographical zone is using the first set of resources, wherein:
the first set of resources is different than a second set of resources associated with a different second type of traffic having a lower priority than the first type of traffic;
the determination is to use the first set of resources when (i) the type of traffic is the second type of traffic and (ii) the location of the apparatus is within the geographical zone;
the determination is to use the first set of resources when (i) the type of traffic is the second type of traffic, (ii) the location of the apparatus is within the geographical zone, and (iii) the apparatus does not detect that the second wireless device within the geographical zone is using the first set of resources; and
the determination is to use the second set of resources when (i) the type of traffic is the second type of traffic or (ii) the location of the apparatus is not within the geographical zone; and
means for communicating with the at least one first wireless device on the first set of resources or the second set of resources, in accordance with the determination, wherein the communications involve the type of traffic.

20. A non-transitory computer-readable medium having computer executable code stored thereon for wireless communications by a first wireless device, the computer executable code comprising:
code for determining whether to use a first set of resources associated with at least a first type of traffic within a geographical zone for communications between the first wireless device and at least one second wireless device, based at least in part on a location of the first wireless device with respect to the geographical zone, a type of traffic associated with the first wireless device, and whether a third wireless device within the geographical zone is using the first set of resources, wherein:
the first set of resources is different than a second set of resources associated with a different second type of traffic having a lower priority than the first type of traffic;
the determination is to use the first set of resources when (i) the type of traffic is the second type of traffic and (ii) the location of the first wireless device is within the geographical zone;
the determination is to use the first set of resources when (i) the type of traffic is the second type of traffic, (ii) the location of the first wireless device is within the geographical zone, and (iii) the first wireless device does not detect that the third wireless device within the geographical zone is using the first set of resources; and
the determination is to use the second set of resources when (i) the type of traffic is the second type of traffic or (ii) the location of the first wireless device is not within the geographical zone; and
code for communicating with the at least one second wireless device on the first set of resources or the second set of resources, in accordance with the determination, wherein the communications involve the type of traffic.

21. The non-transitory computer-readable medium of claim 20, wherein:
the first wireless device and the at least one second wireless device are vehicle-to-everything (V2X) devices;
the first type of traffic is a first type of V2X traffic; and
the second type of traffic is a second type of V2X traffic.

22. The apparatus of claim 19, wherein:
the apparatus and the at least one first wireless device are vehicle-to-everything (V2X) devices;
the first type of traffic is a first type of V2X traffic; and
the second type of traffic is a second type of V2X traffic.

23. The apparatus of claim 19, wherein at least one of the first set of resources, the second set of resources, or the geographical zone is determined based on a negotiation with the at least one first wireless device.

24. The non-transitory computer-readable medium of claim 20, wherein at least one of the first set of resources, the second set of resources, or the geographical zone is determined based on a negotiation with the at least one first second wireless device.

25. The apparatus of claim 19, wherein the determination is to use the second set of resources when the type of traffic is the second type of traffic and the location of the apparatus is within the geographical zone.

26. The apparatus of claim 19, wherein:
the first set of resources further comprises a third set of resources associated with a first direction and a fourth set of resources associated with a second direction different from the first direction; and
the apparatus further comprises means for determining whether to use the third set of resources or the fourth set of resources further based on a direction of the apparatus.

27. The apparatus of claim 26, wherein:
the determination is to use the third set of resources when the type of traffic is the first type of traffic, the apparatus is oriented in the first direction, and the location of the apparatus is within the geographical zone; or
the determination is to use the fourth set of resources when the type of traffic is the first type of traffic, the apparatus is oriented in the second direction, and the location of the apparatus is within the geographical zone.

28. The non-transitory computer-readable medium of claim 20, wherein the determination is to use the second set of resources when the type of traffic is the second type of traffic and the location of the first wireless device is within the geographical zone.

29. The non-transitory computer-readable medium of claim 20, wherein:
the first set of resources further comprises a third set of resources associated with a first direction and a fourth set of resources associated with a second direction different from the first direction; and
the computer executable code further comprises code for determining whether to use the third set of resources or the fourth set of resources further based on a direction of the first wireless device.

30. The non-transitory computer-readable medium of claim 29, wherein:
the determination is to use the third set of resources when the type of traffic is the first type of traffic, the first wireless device is oriented in the first direction, and the location of the first wireless device is within the geographical zone; or
the determination is to use the fourth set of resources when the type of traffic is the first type of traffic, the first wireless device is oriented in the second direction, and the location of the first wireless device is within the geographical zone.

* * * * *